United States Patent
Endo

(10) Patent No.: US 9,435,191 B2
(45) Date of Patent: Sep. 6, 2016

(54) DOWNHOLE SENSOR FLAP AND METHOD OF USING SAME

(71) Applicant: Schlumberger Technology Corporation, Sugar Land, TX (US)

(72) Inventor: Tatsuki Endo, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 326 days.

(21) Appl. No.: 13/929,709

(22) Filed: Jun. 27, 2013

(65) Prior Publication Data

US 2015/0000904 A1  Jan. 1, 2015

(51) Int. Cl.
*E21B 47/01* (2012.01)
*E21B 47/022* (2012.01)
*G01V 1/16* (2006.01)
*G01V 1/52* (2006.01)

(52) U.S. Cl.
CPC ......... *E21B 47/01* (2013.01); *E21B 47/02208* (2013.01); *G01V 1/166* (2013.01); *G01V 1/52* (2013.01); *G01V 2001/526* (2013.01)

(58) Field of Classification Search
CPC ...... E21B 47/00; E21B 47/01; E21B 47/011; E21B 47/02208; G01V 1/166; G01V 2001/526; G01V 1/52
See application file for complete search history.

(56) References Cited

U.S. PATENT DOCUMENTS

| | | | |
|---|---|---|---|
| 4,575,831 A | 3/1986 | Decorps et al. | |
| 4,715,440 A | 12/1987 | Boxell et al. | |
| 4,987,969 A | 1/1991 | Boyle et al. | |
| 5,092,423 A | 3/1992 | Petermann | |
| 6,170,601 B1 | 1/2001 | Nakajima et al. | |
| 6,997,258 B2 | 2/2006 | Homan et al. | |
| 7,178,627 B2 | 2/2007 | West et al. | |
| 7,331,386 B2* | 2/2008 | Kanayama et al. | 166/254.2 |
| 7,458,252 B2 | 12/2008 | Freemark et al. | |
| 7,894,297 B2* | 2/2011 | Nutt et al. | 367/25 |
| 8,255,164 B2 | 8/2012 | Horne | |
| 2004/0223410 A1 | 11/2004 | West et al. | |
| 2012/0131996 A1 | 5/2012 | Anish et al. | |
| 2012/0160011 A1 | 6/2012 | Whittaker et al. | |

FOREIGN PATENT DOCUMENTS

| | | |
|---|---|---|
| EP | 0303536 | 2/1989 |
| WO | 2013/033138 | 3/2013 |

OTHER PUBLICATIONS

International search report and written opinion for the equivalent PCT patent application No. PCT/US2014/044490 issue on Oct. 28, 2014.
Schlumberger Brochure, "Fundamentals of Borehole Seismic Technology".

* cited by examiner

*Primary Examiner* — Elizabeth Gitlin
(74) *Attorney, Agent, or Firm* — Daryl R. Wright; Wesley Noah

(57) ABSTRACT

A sensor flap for a downhole tool. The downhole tool is positionable in a wellbore penetrating a subterranean formation. The sensor flap includes a sensor housing and at least one sensor. The sensor housing is operatively connectable to the downhole tool. The sensor housing is movably positionable between a retracted position in the downhole tool and an extended position in contact with a wall of the wellbore. The sensor is positionable in the sensor housing, and may include a seismic detector to measure seismic activity when the sensor housing is in contact with the wall of the wellbore.

18 Claims, 6 Drawing Sheets

(56) References Cited

OTHER PUBLICATIONS

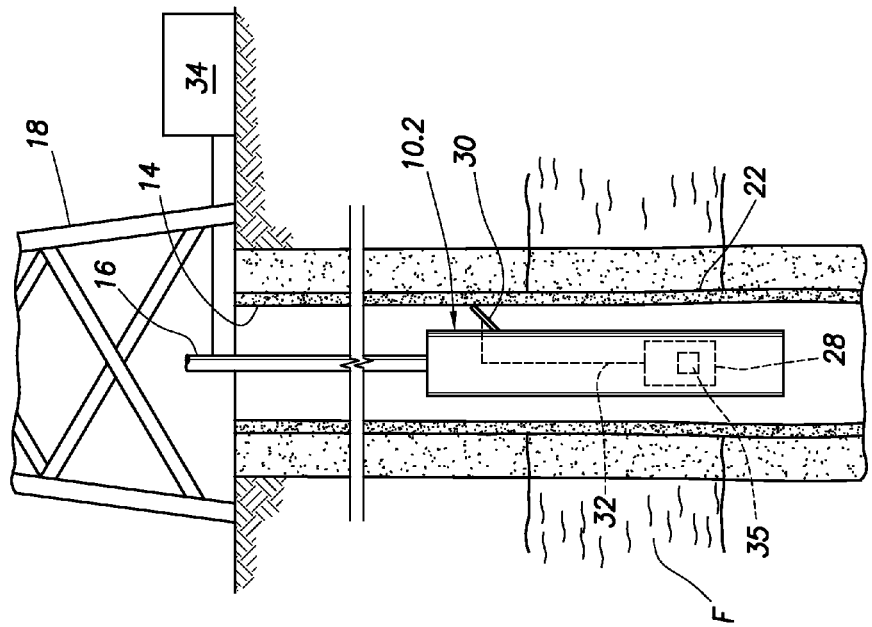
FIG.1.2
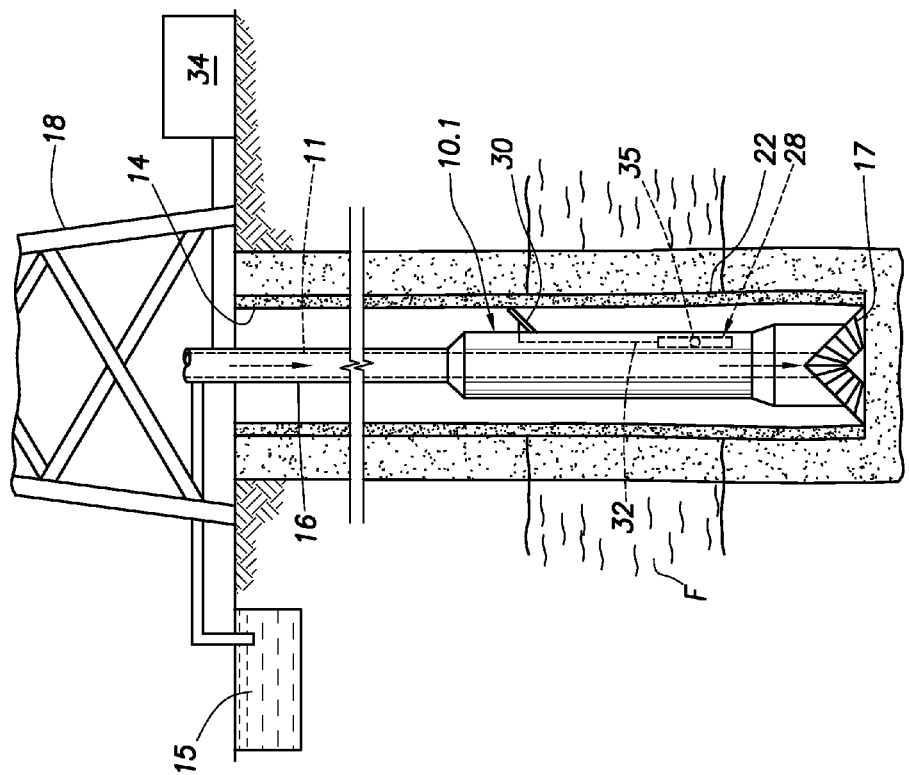
FIG.1.1

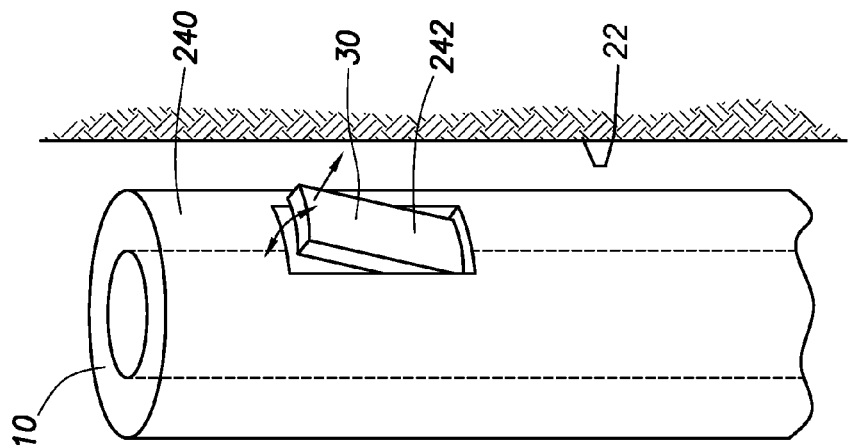
FIG.2.2
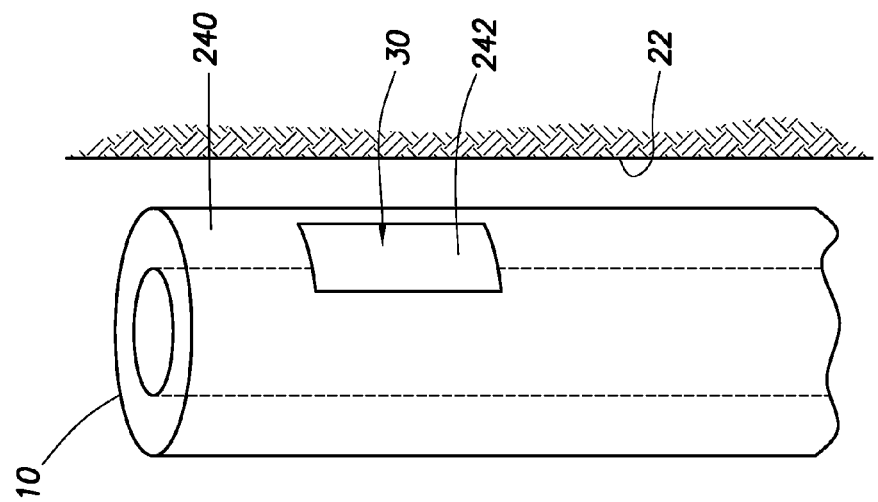
FIG.2.1

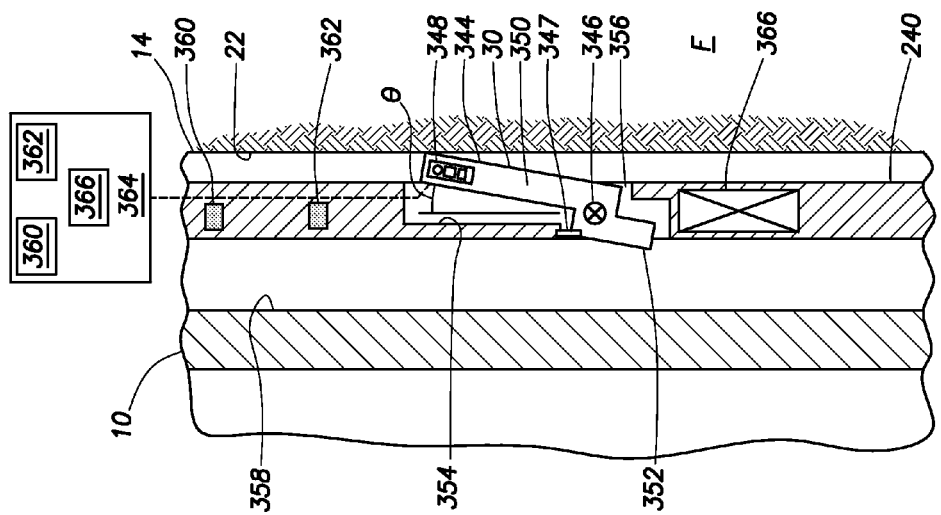
FIG.3.1
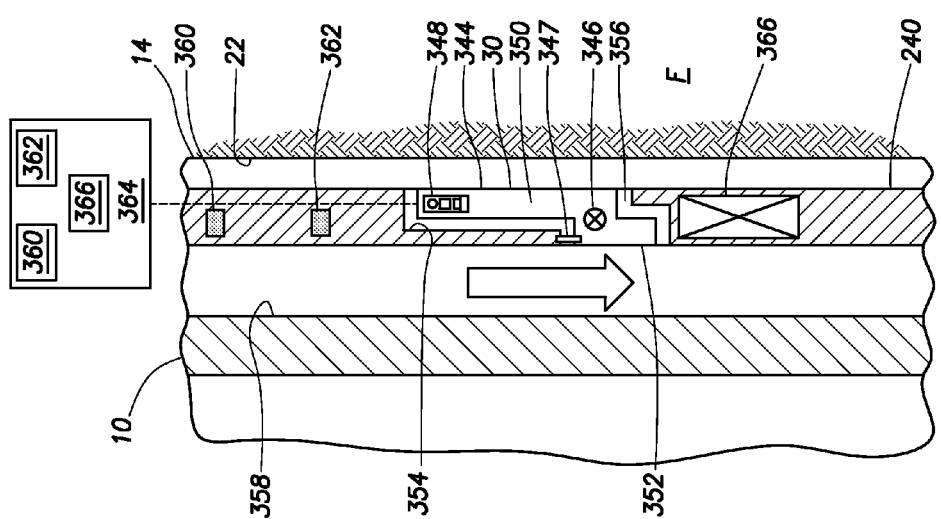
FIG.3.2

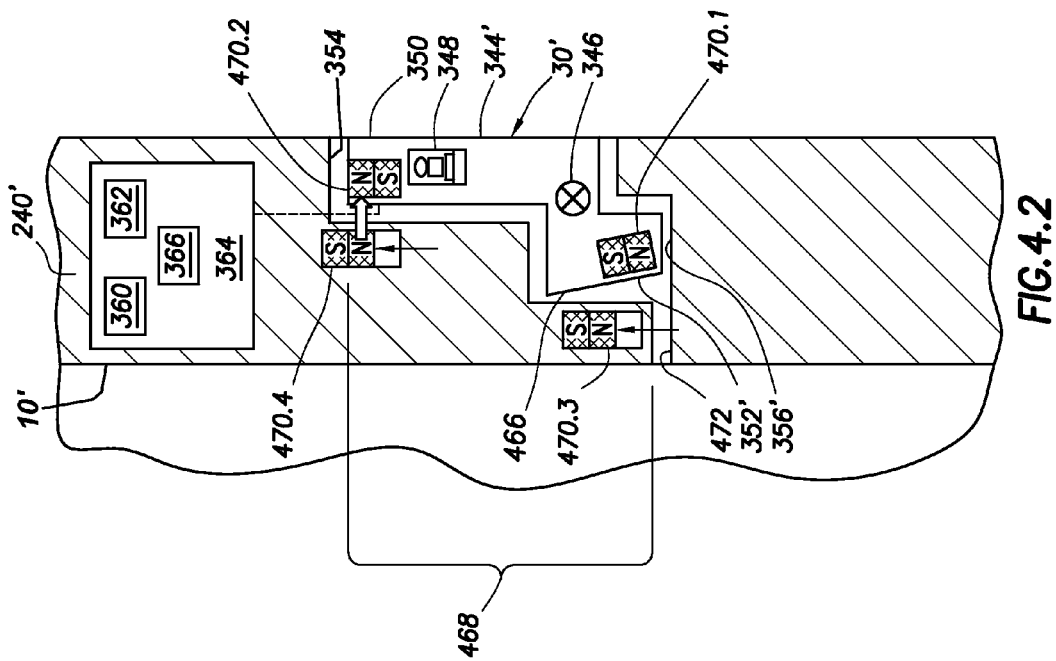
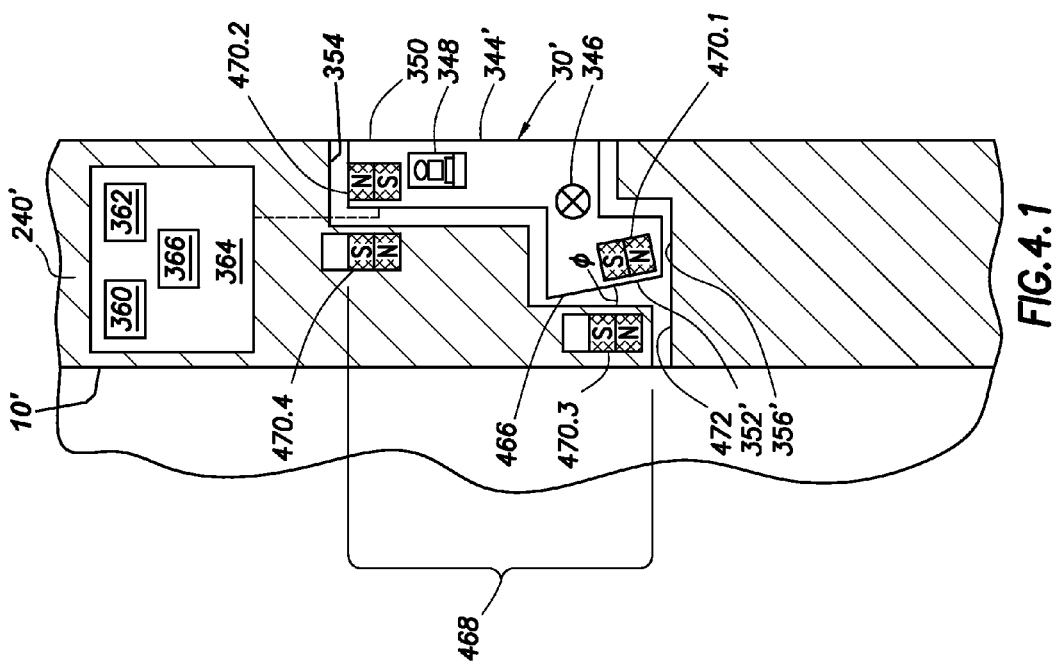

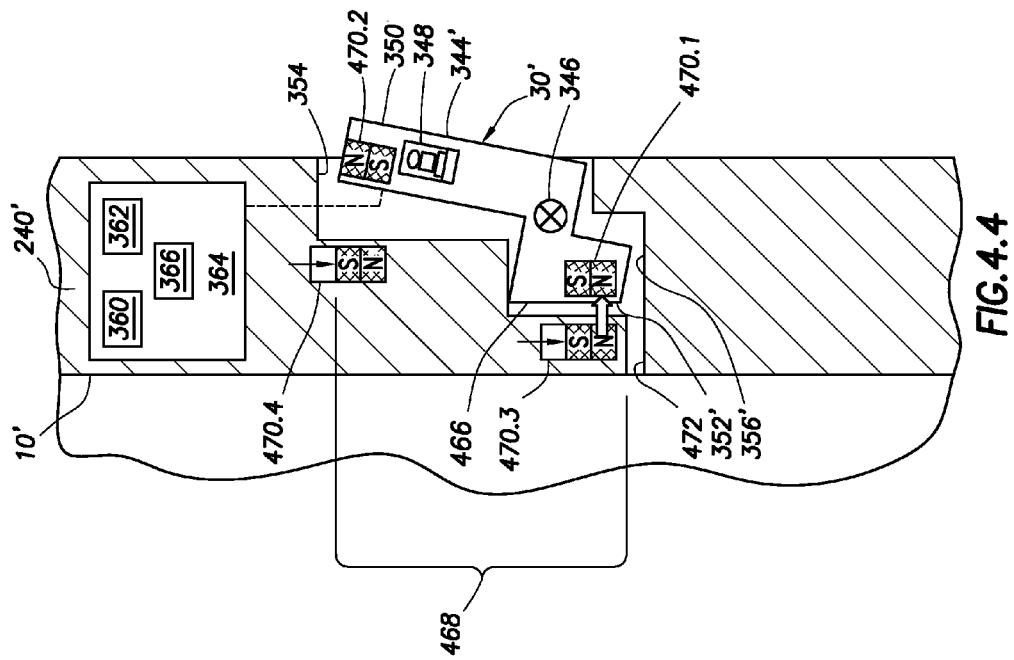
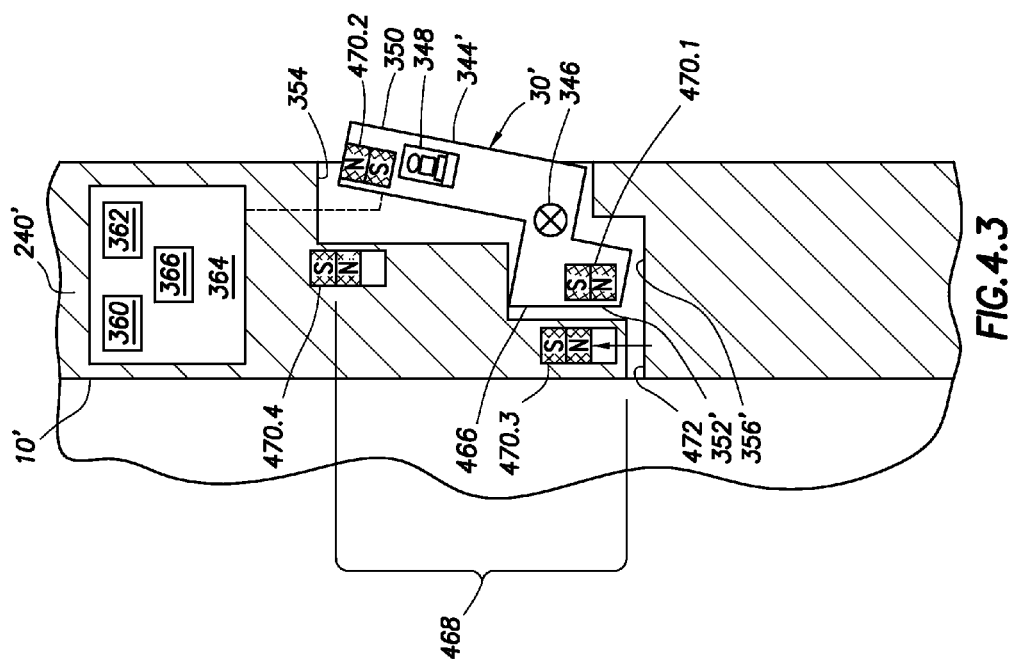

DOWNHOLE SENSOR FLAP AND METHOD OF USING SAME

BACKGROUND

The present disclosure relates generally to wellsite operations. In particular, the present disclosure relates to formation evaluation, such as sensing downhole properties.

Wellbores are drilled to locate and produce hydrocarbons. A downhole drilling tool with a bit at an end thereof is advanced into the ground to form a wellbore. As the drilling tool is advanced, drilling mud is pumped through the drilling tool and out the drill bit to cool the drilling tool and carry away cuttings. The fluid exits the drill bit and flows back up to the surface for recirculation through the drilling tool. The drilling mud is also used to form a mudcake to line the wellbore.

During or after a drilling operation, various downhole evaluations may be performed to determine characteristics of the wellbore and surrounding formation. In some cases, the drilling tool may be provided with devices to test the surrounding formation. In some cases, the drilling tool may be removed and a downhole wireline tool may be deployed into the wellbore to test the formation. These tests may be used, for example, to determine whether valuable hydrocarbons are present. Production equipment may be positioned in the wellbore to draw located hydrocarbons to the surface.

Formation evaluation may involve positioning sensors in the wellbore to take downhole measurements for the formation. Downhole tools may be provided with sensors for measuring downhole parameters. Examples of sensors are provided in U.S. Pat. No. 6,170,601 and U.S. Pat. No. 6,997,258.

SUMMARY

In one aspect, the disclosure relates to a sensor flap for a downhole tool positionable in a wellbore penetrating a subterranean formation. The sensor flap includes a sensor housing and at least one sensor. The sensor housing is operatively connectable to the downhole tool, and is movably positionable between a retracted position in the downhole tool and an extended position in contact with a wall of the wellbore. The sensor is positionable in the sensor housing, and may include a seismic detector to measure seismic activity when the sensor housing is in contact with the wall of the wellbore.

In another aspect, the disclosure relates to a downhole tool positionable in a wellbore penetrating a subterranean formation. The downhole tool includes a tool housing having a wall with an outer surface, and a sensor flap positionable in the tool housing. The sensor flap includes a sensor housing and at least one sensor. The sensor housing is operatively connectable to the downhole tool, and is movably positionable between a retracted position in the downhole tool and an extended position in contact with a wall of the wellbore. The sensor is positionable in the sensor housing, and may include a seismic detector to measure seismic activity when the sensor housing is in contact with the wall of the wellbore.

In still another aspect, the disclosure relates to a method of sensing downhole properties in a wellbore penetrating a subterranean formation. The method involves deploying a downhole tool into the wellbore. The downhole tool includes a tool housing having a wall with an outer surface, a sensor flap positionable in the tool housing and having a sensor housing operatively connectable to the tool housing, and at least one sensor positionable in the sensor housing. The sensor may include a seismic detector. The method further involves selectively moving the sensor housing between a retracted position in the tool housing and an extended position in contact with a wall of the wellbore, and sensing downhole properties with the seismic detector when the sensor housing is in contact with the wall of the wellbore.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of downhole sensor flaps and methods of using same are described with reference to the following figures. The same numbers are used throughout the figures to reference like features and components.

FIGS. 1.1 and 1.2 are schematic views, partially in cross-section, illustrating a wellsite with a downhole drilling tool and a downhole wireline tool, respectively, deployed into a wellbore for performing downhole formation evaluation in accordance with embodiments of the present disclosure;

FIGS. 2.1 and 2.2 are schematic, perspective views illustrating a portion of a downhole tool having a sensor flap in a retracted position and an extended position, respectively, in accordance with embodiments of the present disclosure;

FIGS. 3.1 and 3.2 are schematic, cross-sectional views illustrating a portion of a downhole tool having a flow activated sensor flap in a retracted position and an extended position, respectively, in accordance with embodiments of the present disclosure;

FIGS. 4.1-4.4 are schematic, cross-sectional views illustrating a portion of a downhole tool having a magnet activated sensor flap in a retracted position and an extended position, respectively, in accordance with embodiments of the present disclosure.

DETAILED DESCRIPTION

Figure 5:
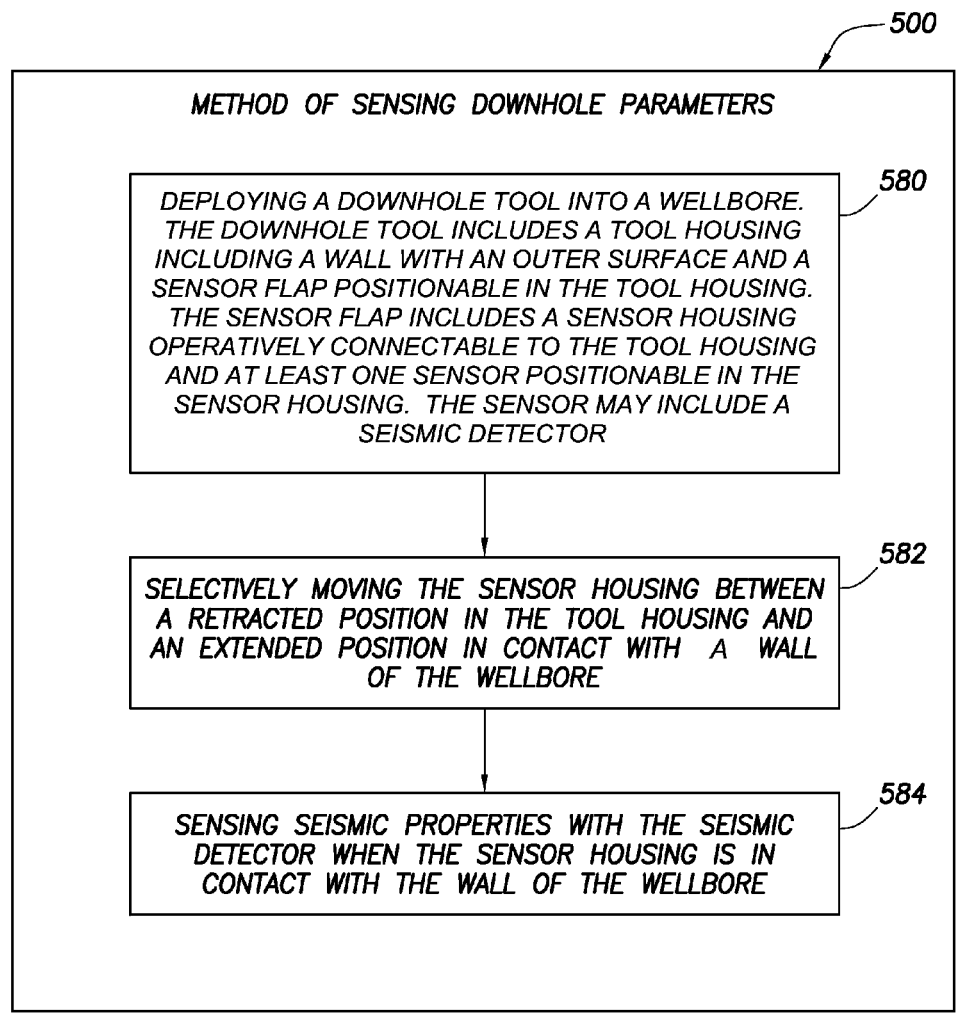
FIG. 5 is a flow chart illustrating a method of sensing downhole properties in accordance with embodiments of the present disclosure.

The description that follows includes exemplary systems, apparatuses, methods, techniques, and instruction sequences that embody techniques of the inventive subject matter. However, it is understood that the described embodiments may be practiced without these specific details.

The present disclosure relates to formation evaluation using a downhole sensor flap. In particular, the disclosure relates to a downhole tool positionable in a wellbore and having the sensor flap selectively extendable therefrom by fluid flow passing adjacent the sensor flap, or by activation of magnets positioned about the sensor flap. The sensor flap also has a spring to urge the sensor flap to a retracted position until overcome and moved to an extended position adjacent a wall of the wellbore. The sensor flap has a sensor positionable adjacent the wall of the wellbore for measurement of downhole properties, such as seismic properties, thereabout.

'Formation evaluation' as used herein relates to the measurement, testing, sampling, and/or other analysis of wellsite materials, such as gases, fluids and/or solids. Such formation evaluation may be performed at surface and/or downhole to provide data, such as downhole properties (e.g., temperature, pressure, permeability, porosity, seismic, etc.), material properties (e.g., viscosity, composition, density, etc.), and the like.

FIGS. 1.1 and 1.2 depict environments in which subject matter of the present disclosure may be implemented. FIG. 1.1 depicts a downhole drilling tool 10.1 and FIG. 1.2 depicts a downhole wireline tool 10.2, both tools may be used for performing formation evaluation. The downhole drilling tool 10.1 may be advanced into a subterranean formation F to form a wellbore 14. Drilling mud may be pumped from a mud pit 15, through a passage 11 in the downhole drilling tool 10.1, and out a drill bit 17 to line the wellbore 14.

The downhole drilling tool 10.1 may be conveyed alone or among one or more (or itself maybe) measurement-while-drilling (MWD) drilling tools, logging-while-drilling (LWD) drilling tools, or other drilling tools. The downhole drilling tool 10.1 is attached to a conveyor (e.g., drillstring) 16 driven by a rig 18 to form the wellbore 14. The downhole drilling tool 10.1 may be withdrawn from the wellbore 14, and the downhole wireline tool 10.2 of FIG. 1.2 may be deployed from the rig 18 into the wellbore 14 via conveyance (e.g., a wireline cable) 16.

The downhole tools 10.1, 10.2 may be provided with a formation evaluation tool 28 for collecting and/or analyzing downhole measurements. The downhole tools 10.1 and 10.2 are provided with a sensor flap 30 extendable therefrom for contacting the wall 22 of the wellbore 14 and measuring downhole properties. The formation evaluation tool 28 may include a downhole unit 35 operatively connected by link 32 to the sensor flap 30 for operation therewith. The sensor flap 30 may be a part of the formation evaluation tool 28 or separate therefrom.

A surface unit 34 may be provided to communicate with downhole tool 10.1, 10.2 for passage of signals (e.g., data, power, command, etc.) therebetween. Outputs may be generated from the surface unit 34 and/or a downhole unit 35 based on the measurements collected by the formation evaluation tool 28 and/or the sensor flap 30. Such outputs may be in the form of data, measurements, reports, and/or other outputs.

While FIGS. 1.1 and 1.2 depict specific types of downhole tools 10.1 and 10.2, any downhole tool capable of performing formation evaluation may be used, such as drilling, coiled tubing, wireline, production or other downhole tool or equipment. Also, while FIGS. 1.1 and 1.2 depict a single sensor flap 30, one or more sensor flaps 30 and/or other sensing devices may be provided about the downhole tool for measuring downhole properties. The sensor flap 30 may be positioned in the downhole tool to provide real-time data collected in-situ at downhole conditions (e.g., temperatures and pressures where formation evaluation is performed), and/or stored in memory for later retrieval. Data and test results obtained from various locations and/or using various methods and/or apparatuses may be analyzed and compared.

FIGS. 2.1 and 2.2 are schematic views of a portion of a downhole tool 10, which may be either of the downhole tools 10.1 and 10.2 of FIGS. 1.1 and 1.2. FIGS. 2.1 and 2.2 show the sensor flap 30 in a retracted position and an extended position, respectively. As also shown in these views, the sensor flap 30 is positioned along an outer wall 240 of the downhole tool 10.

The sensor flap 30 has an outer surface 242 that conforms to the outer wall 240 of the downhole tool 10. As also shown in this view, the sensor flap 30 has a generally rectangular shape, but may be any shape to provide measurements as desired. The outer surface 242 of the sensor flap 30 may be of the same material and/or have a similar curvature as the outer wall 240 of the downhole tool 10 to provide a consistent surface therealong. In some cases, the sensor flap 30 may have other shapes that may or may not be similar to the outer wall 240 of the downhole tool 10.

The sensor flap 30 is selectively extendable from the downhole tool 10. As shown in FIG. 2.2, a top of the sensor flap 30 tilts away from the outer wall 240 of the downhole tool 10 and the bottom of the sensor flap 30 remains adjacent the outer wall 240 of the downhole tool 10. The sensor flap 30 may be configured to tilt a desired distance and angle relative to the downhole tool 10, as desired. For example, the sensor flap 30 may be configured to contact the wall 22 of the wellbore for measurement therealong.

FIGS. 3.1-3.2 and 4.1-4.4 show cross-sectional views of the sensor flap 30, 30'. These views show the sensor flap 30, 30' and other components of the downhole tool 10, 10' in greater detail. FIGS. 3.1 and 3.2 show the sensor flap 30 as being selectively activated by the flow of fluid past the sensor flap 30. The fluid activation provides a passive means for moving the sensor flap 30 between a retracted position and an extended position.

As shown in FIGS. 3.1 and 3.2, the sensor flap 30 includes a sensor housing 344, a connector 346, and a sensor 348. The sensor housing 344 has a sensor portion 350 and a flow portion 352. The sensor portion 350 and the flow portion 352 are each shaped as rectangular plates joined at the connector 346. The sensor portion 350 and the flow portion 352 may be integrally or separately formed. The connector 346 pivotally mounts the sensor housing 344 to the outer wall 240 of the downhole tool 10. The connector 346 may be, for example, a pin to pivotally connect the sensor flap 30 to the downhole tool 10.

The sensor portion 350 is positioned in an outer pocket 354 extending through the outer wall 240 of the downhole tool 10. The outer pocket 354 defines a receptacle for receiving the sensor portion 350. The flow portion 352 is positioned in an inner pocket 356 adjacent a flow channel 358 in the downhole tool 10. The inner pocket 356 defines a receptacle for receiving the flow portion 352. The flow channel 358 may be, for example, the mud passage 11 extending through the downhole tool (e.g., 10.1 of FIG. 1.1).

Flow of fluid through the flow channel 358 as indicated by the arrow may apply a force to the flow portion 352. The force of fluid flow presses against the flow portion 352 to urge the sensor housing 344 to the retracted position of FIG. 3.1.

Termination of flow through the flow channel 358 may remove the force applied to the flow portion 352, and release the sensor housing 344 to pivot about connector 346 to the extended position of FIG. 3.2. The sensor housing 344 is then free to move to an extended position adjacent wall 22 of the wellbore 14 as shown in FIG. 3.2. Optionally, a spring 347 may be provided to urge the sensor housing 344 to the extended position. The spring force may be overcome by flow of fluid to return the sensor housing 344 to the retracted position of FIG. 3.1.

Termination of flow may occur, for example, when mud stops passing through the downhole tool 10 and the downhole tool ceases a drilling operation. In some cases, measurements may be taken when the downhole tool 10 stops performing drilling or other operations. In applications where the downhole tool 10 is a drilling tool 10.1, data may be acquired when the drilling tool is stopped (e.g., during pipe connection, when drill pipe and/or bottom hole assembly (BHA) are not rotating, and/or when there is no mud flow). The sensor flap 30 may remain retracted until such time that the downhole tool ceases such operations. Termination of fluid flow through the fluid channel 358 may signal termination of operations and also activate the sensor housing 344 to move to the extended (or measurement) position of FIG. 3.2.

As also shown in FIG. 3.2, the sensor housing 344 pivots at an angle θ from the outer wall 240 of the downhole tool 10. The angle θ and/or the sensor flap 30 may be configured relative to the diameter of the wellbore and the diameter of the downhole tool 10 such that the angle θ is large enough for the sensor flap 30 to contact wall 22 of the wellbore 14.

The sensor 348 may be positioned adjacent a sensor end of the sensor portion 350 for measuring properties of the formation F. The sensor 348 may include, for example, a seismic sensor capable of sensing seismic properties of the formation, such as ground motion. The sensors may be, for example, in the form of geophone, geophone accelerometer, MEMS (micro electro-mechanical systems) accelerometer, etc. The sensor 348 may optionally contain one or more sensors capable of measuring a variety of downhole properties when in the extended or retracted position.

Positive contact between sensor flap 30 and the wellbore wall 22 may be used, for example, to measure borehole seismic properties of the formation F surrounding the wellbore 14, such as detecting particle motion in acceleration, velocity or displacement (e.g., at the wellbore wall 22), etc. Positive contact may be provided when the downhole tool 10 presses against the wall 22 and/or when the sensor flap 30 is extended for contact with the wall 22.

As also schematically shown, the sensor 348 may be coupled to various components in the downhole tool 10, such as MWD 360, LWD 362, downhole unit 364, actuator 366 and/or other components of the downhole tool 10. The sensor 348 may pass data to the various components, such as to the downhole unit 364, the surface unit 34 (see, e.g., FIGS. 1.1 & 1.2) or other onsite or offsite units, for storage, analysis, transport to the surface, or other processing. The data may be compared with other data and reports may be generated. Action may be taken based on the data collected.

FIGS. 4.1-4.4 are schematic views of a portion of another downhole tool 10' with another version of a sensor flap 30'. In this version, the sensor flap 30' is movable between a retracted position and an extended position using an actuator. As shown in these figures, the sensor flap 30' includes a sensor housing 344', the connector 346, and the sensor 348. The sensor housing 344' is similar to the sensor housing 344, except that the sensor housing 344' has a sensor portion 350 as previously described and a modified actuator portion 352'.

In the actuator version of FIGS. 4.1-4.4, an actuator 468 is also provided. In this version, the actuator 468 is a set of magnets 470.1-470.4 positioned about a modified wall 240' of the downhole tool 10' and the sensor housing 344'. Magnets 470.1 and 470.2 are provided in the actuator portion 352' and the sensor portion 350, respectively, of the sensor housing 344'. Part or all of the downhole tool 10' may be a non-magnetic material.

Magnets 470.3 and 470.4 are movably positioned in the downhole tool 10' at locations adjacent the magnets 470.1 and 470.2, respectively. The magnets 470.3, 470.4 may be rotatably or slidably positionable in the wall 240' of the downhole tool 10'. The magnets 470.3, 470.4 may be positioned along a linear shaft or rotational spindle and movable using a driver, such as a motor.

The modified wall 240' is configured to receive the sensor flap 30'. The modified wall 240' has an outer pocket 354 to receive the sensor portion 350 as previously described. The modified wall 240' also has a modified inner pocket 356' adjacent to the outer pocket 354 for receiving the actuator portion 352'. The inner pocket 356' in this version encloses the actuator portion 352', except for an optional channel 472 that may be provided, if desired. The actuator portion 352' has a tapered actuation surface 466 defining an angle φ between the wall 240' and the sensor housing 344'.

The magnets 470.3, 470.4 may be selectively moved to a desired position to selectively move the sensor housing 344' between a retracted position and an extended position. In the retracted position of FIG. 4.1, the actuation surface 466 is positioned a distance from the wall 240' along inner pocket 356', and the magnets 470.1 and 470.3 are a distance apart. The sensor portion 350 is positioned in pocket 354 with the magnet 470.2 adjacent the magnet 470.4.

In the retracted position of FIG. 4.1, the magnet 470.4 is positioned in an attraction position with the pole N of the magnet 470.4 positioned adjacent the pole S of the magnet 470.2, and with the pole S of the magnet 470.4 positioned adjacent the pole N of the magnet 470.2. In this attraction position, the sensor portion 350 is attracted to urge the sensor flap 30' to the retracted position. The magnet 470.3 is positioned in a repel position with the pole N of the magnet 470.3 positioned adjacent the pole N of the magnet 470.1, and with the pole S of the magnet 470.3 positioned adjacent the pole S of the magnet 470.1. In this repel position, the actuation portion 352' is repelled to urge the sensor flap 30' to the retracted position.

As shown in a deactivated position of FIG. 4.2, the magnets 470.3, 470.4 are shifted such that magnet 470.1 is attracted to magnet 470.3 and magnet 470.2 is repelled by magnet 470.4. The poles of magnets 470.2, 470.4 are positioned so that the poles S-S and N-N align to repel each other and the poles of magnets 470.1, 470.3 are positioned so that the poles S-N and N-S align to attract each other, thereby pushing the sensor portion 350' to the extended position as shown in FIG. 4.3.

As shown in FIG. 4.3, magnets 470.1 and 470.3 are attracted to shift the actuator portion 352' toward the wall 240' of the downhole tool 10' such that the tapered surface 466 is positioned adjacent the wall 240' along pocket 356'. Magnets 470.2 and 470.4 are repelled to shift the sensor portion 350 away from the downhole tool 10' such that the sensor portion 350 is positionable adjacent the wall 22 of the wellbore 14 (see, e.g., FIGS. 1.1 & 1.2).

As shown in the deactivated position of FIG. 4.4, the sensor flap 30' may be shifted back to the retracted position by shifting the magnets 470.3 and 470.4 back to their original position of FIG. 4.1. The magnets 470.3, 470.4 are shifted such that magnet 470.1 is repelled by magnet 470.3 and magnet 470.2 is attracted by magnet 470.4. The magnetic forces drive the actuator portion 352' away from the wall 240' along pocket 356,' and the sensor portion 350 back into pocket 354. The poles of magnets 470.2, 470.4 are positioned so that the poles S-N and N-S align to attract each other and the poles of magnets 470.1, 470.3 are positioned so that the poles N-N and S-S align to repel each other, thereby pushing the sensor portion 350 back to the retracted position as shown in FIG. 4.1.

As also schematically shown, the sensor 348 may be coupled to various components in the downhole tool 10', such as MWD 360, LWD 362, downhole unit 364, controller 366 and/or other components of the downhole tool 10'. The sensor 348 may pass data to the various components, such as to the downhole unit 364, the surface unit 34 or other onsite or offsite units, for storage, analysis, transport to the surface, or other processing. The data may be compared with other data and reports may be generated. Action may be taken based on the data collected. The sensor 348 may also be powered by the downhole unit 364 and/or controlled by the controller 366 to selectively activate as desired.

The downhole tool, sensor flap and/or actuator provided herein may be powered using, for example, power generated by mud flow through the tool, electricity passing through a cable, batteries or other power sources. In an example, power through the downhole tool may be generated by mud flow through the drilling tool. When flow ceases, power may also terminate. This termination may be used to activate the downhole tool.

While FIGS. 2.1-3.2 depict a passive sensor flap 30 activated by fluid flow and FIGS. 4.1-4.4 depict an active sensor flap 30' activated by magnets, various combinations of the passive and active systems may be provided. For example, the passive sensor flap 30 may be provided with an actuator, such as the magnets of the active sensor flap 30' or another device to optionally activate the passive sensor flap 30 to extend and/or retract as desired.

The downhole tool may be provided with one or more sensors to measure various downhole properties and/or fluid properties. The sensor(s) may include, for example, gauges (e.g., quartz), densitometers, viscometers, resistivity sensors, nuclear sensors, and/or other measurement and/or detection devices capable of taking downhole data relating to, for example, downhole conditions and/or fluid properties.

Additionally, while the examples of FIGS. 2.1-4.4 depict various sensor flaps extendable using various actuators (passive and active) herein, it will be appreciated that other techniques may be used to extend and/or retract the sensor flap, such as an anchoring flap, piston flap, bow spring and other existing configurations. One or more of the sensor flaps provided herein may also be used in combination with one or more other existing sensors and/or sensor systems.

FIG. 5 shows an example method 500 of sensing downhole properties. The method involves 580—deploying a downhole tool into a wellbore. The downhole tool includes a tool housing including a wall with an outer surface and a sensor flap positionable in the tool housing. The sensor flap includes a sensor housing operatively connectable to the tool housing and at least one sensor positionable in the sensor housing. The sensor may include a seismic detector. The method also involves 582—selectively moving the sensor housing between a retracted position in the tool housing and an extended position in contact with a wall of the wellbore, and 584—sensing seismic properties with the seismic detector when the sensor housing is in contact with the wall of the wellbore.

The method may be performed in any order and repeated as desired.

Plural instances may be provided for components, operations, or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A sensor flap for a downhole tool positionable in a wellbore penetrating a subterranean formation, the sensor flap comprising:
   a sensor housing operatively connectable to the downhole tool via a pivotable member, the sensor housing rotatable between a first position in which a sensor portion of the sensor housing is located within the downhole tool and a second position in which the sensor portion is configured to contact with a wall of the wellbore; and
   at least one sensor positionable in the sensor portion of the sensor housing, the at least one sensor comprising a seismic detector to measure seismic activity when the sensor housing is in the second position.

2. The sensor flap of claim 1, wherein the sensor housing has an interior portion on an end of the sensor housing opposite the pivot member from the sensor portion and positionable adjacent a flow channel of the downhole tool so as to receive a force when wellbore fluid flows therethrough.

3. The sensor flap of claim 1, wherein the sensor housing is selectively movable in response to fluid flow through the downhole tool.

4. The sensor flap of claim 1, further comprising an actuator to selectively rotate the sensor housing between the first position and the second position.

5. The sensor flap of claim 4, wherein the actuator comprises tool magnets in the downhole tool and corresponding sensor magnets in the sensor housing, the tool magnets positionable to selectively attract and repel the sensor magnets.

6. The sensor flap of claim 1, wherein the sensor housing is selectively movable in response to power to the downhole tool.

7. The sensor flap of claim 1, further comprising a spring urging the sensor housing to the first position.

8. A downhole tool positionable in a wellbore penetrating a subterranean formation, the downhole tool comprising:
   a tool housing comprising a wall with an outer surface; and
   a sensor flap positionable in the tool housing, the sensor flap comprising:
       a sensor housing operatively connectable to the wall of the tool housing via a pivotable member, the sensor housing rotatable between a first position in which a sensor portion of the sensor housing is located within the downhole tool and a second position in which the sensor portion is configured to contact with a wall of the wellbore; and
       at least one sensor positionable in the sensor portion of the sensor housing, the at least one sensor comprising a seismic detector to measure seismic activity when the sensor housing is in the second position.

9. The downhole tool of claim 8, further comprising a surface unit.

10. The downhole tool of claim 8, further comprising at least one of a logging-while-drilling tool, a measurement-while-drilling tool, and combinations thereof.

11. The downhole tool of claim 8, wherein the tool housing has a fluid passage therethrough, the fluid passage to pass a wellbore fluid therethrough such that a force is applied to move the sensor housing to the first position.

12. The downhole tool of claim 8, wherein the tool housing and the sensor housing each has magnets therein, the magnets of the tool housing movable between an attraction and a repel position to selectively attract and repel the magnets of the sensor housing about the tool housing.

13. The downhole tool of claim 8, wherein the tool housing has an outer pocket to receive the sensor portion of the sensor housing, and an inner pocket to receive an interior portion of the sensor housing.

14. A method of sensing downhole properties in a wellbore penetrating a subterranean formation, the method comprising:
deploying a downhole tool into the wellbore, the downhole tool comprising a tool housing comprising a wall with an outer surface and a sensor flap positionable in the tool housing, the sensor flap comprising a sensor housing operatively connectable to the tool housing via a pivotable member and at least one sensor positionable in a sensor portion of the sensor housing, the at least one sensor comprising a seismic detector;
selectively rotating the sensor housing between a first position in which the sensor portion is located within the tool housing and a second position in which the sensor portion is configured to contact with a wall of the wellbore; and
sensing seismic properties with the seismic detector when the sensor portion of the sensor housing is in contact with the wall of the wellbore.

15. The method of claim 14, wherein selectively rotating the sensor housing comprises rotating the sensor housing between the first position and the second position by selectively passing wellbore fluid through the downhole tool.

16. The method of claim 14, wherein selectively rotating the sensor housing comprises rotating the sensor housing between the first position and the second position by selectively magnetically engaging magnets in the tool housing with magnets in the sensor housing.

17. The method of claim 14, further comprising passing sensed downhole properties to at least one of a downhole unit and a surface unit.

18. The method of claim 14, further comprising analyzing the seismic properties.

\* \* \* \* \*